Patented Sept. 29, 1925.

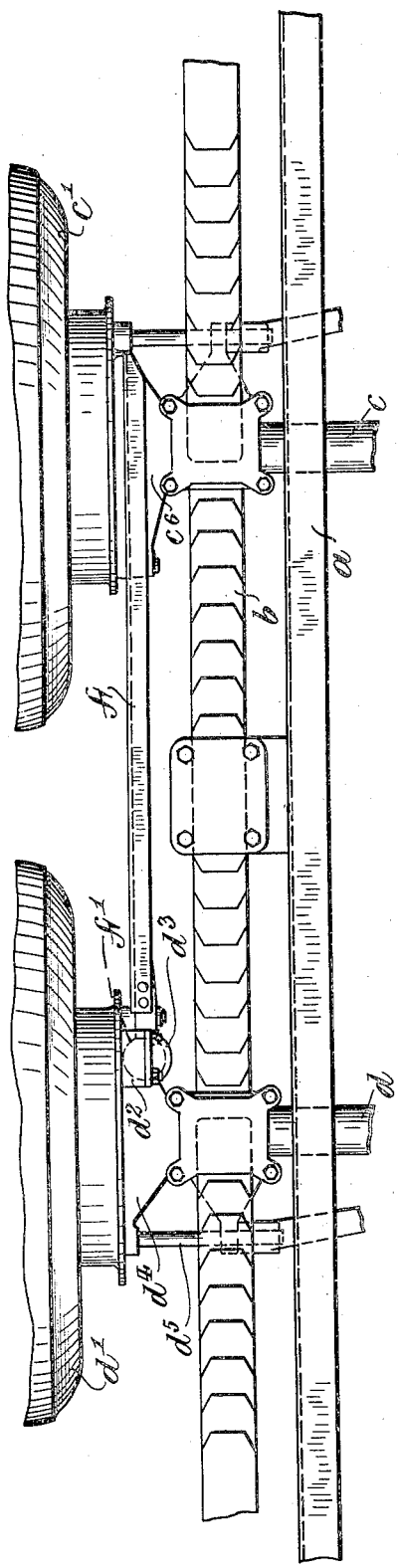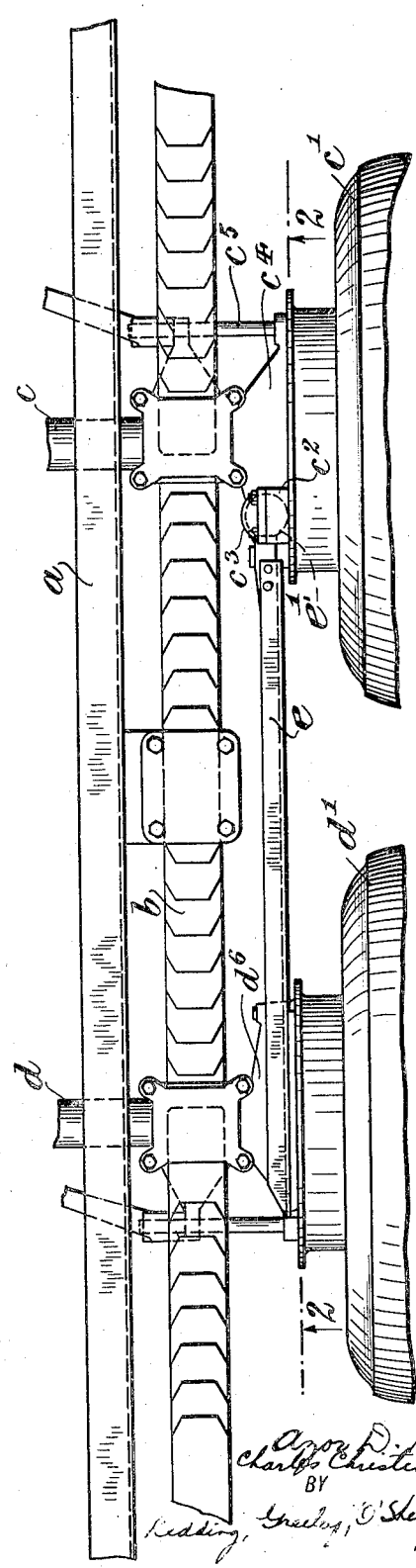

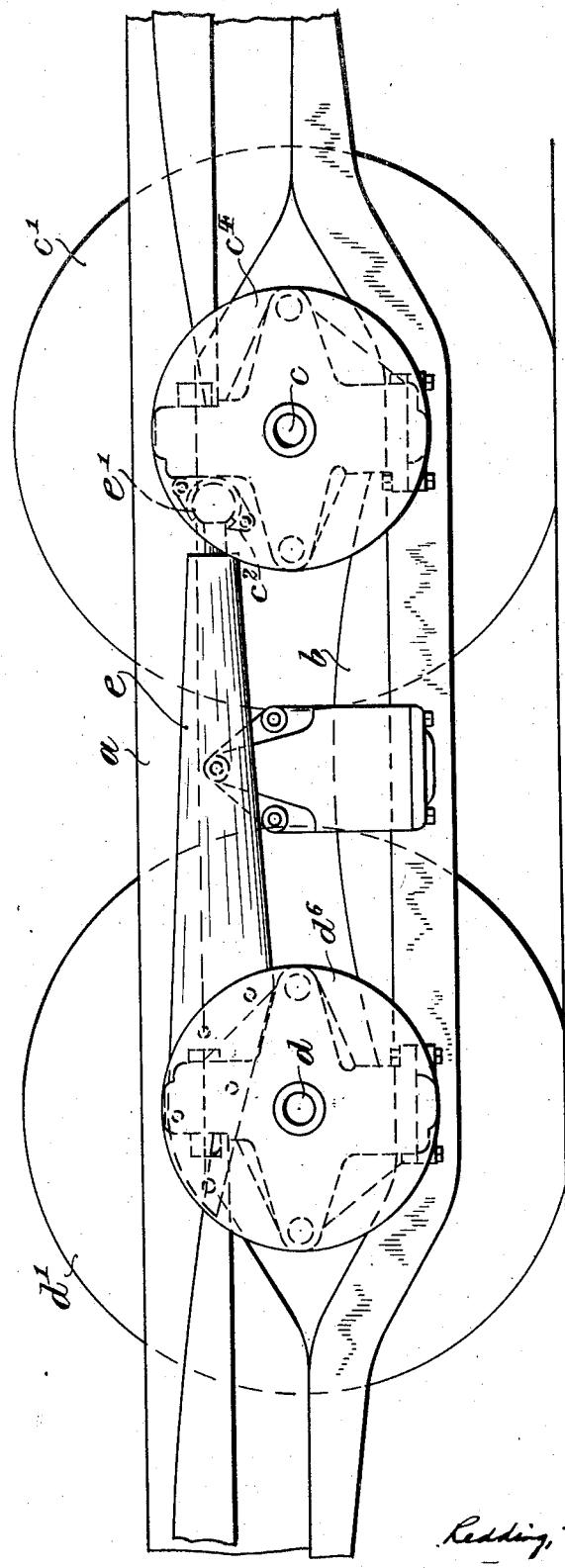

1,555,613

UNITED STATES PATENT OFFICE.

AZOR D. ROBBINS AND CHARLES CHRISTIAN REINKE, OF NEW YORK, N. Y., ASSIGNORS TO INTERNATIONAL MOTOR COMPANY, OF NEW YORK, N. Y., A CORPORATION OF DELAWARE.

TORQUE-ROD CONNECTION FOR DUAL REAR AXLES.

Application filed September 24, 1923. Serial No. 664,358.

*To all whom it may concern:*

Be it known that we, AZOR D. ROBBINS and CHARLES CHRISTIAN REINKE, citizens of the Commonwealth of Australia and of the United States, respectively, residing in the borough of Manhattan and the borough of Bronx, in the city of New York, in the State of New York, respectively, have invented certain new and useful Improvements in Torque-Rod Connections for Dual Rear Axles, of which the following is a specification, reference being had to the accompanying drawing, forming a part hereof.

This invention relates to a torque rod connection for dual rear axles and is designed primarily with reference to its use in connection with dual rear axles of a motor vehicle. The principal object of the invention is to interconnect such dual axles by means of a pair of torque rods disposed adjacent opposite ends thereof and adapted to afford maximum capacity for relative movement therebetween. In accordance with the preferred embodiment of the invention it is proposed to connect the respective torque rods rigidly to the respective axles and engage the free ends thereof with the other axle, respectively, through a joint affording capacity for pivotal movement. More particularly, the preferred embodiment is one in which the free end of each of the torque rods carries a ball which is connected to the appropriate axle through a socket bearing having a detachable cap.

The invention will be described with greater particularity in connection with the illustrated embodiment shown in the drawings, wherein:

Figure 1 is a fragmentary view in plan of so much of a motor vehicle and the dual rear axles therefor and spring suspension as is necessary for an understanding of the application thereto of the improved torque rods.

Figure 2 is a view in side elevation and of a diagrammatic character illustrating the relation of one of the torque rods to the dual axles shown in Figure 1.

While the invention is not to be limited to the character of the vehicle with which the improved torque rods are associated nor to any particular design of spring suspension therefor so much of a motor vehicle chassis and its spring suspension has been shown in the drawings as is necessary for an understanding of the application of the improved torque rods to dual axles provided therefor. The side frame members $a$ of the chassis are supported through pairs of live springs $b$ carried on dual axles $c$, $d$, on which are journaled the road wheels $c'$, $d'$, respectively. The problem with which the present invention is concerned is that of maintaining the axles $c$, $d$, in spaced relationship while providing for the mutual reaction thereof to resist torque strains in starting and stopping and yet afford capacity for relative movement therebetween to insure flexibility and relief from such stresses as might be imposed by too great a degree of rigidity. To this end, it is proposed in the preferred embodiment to interconnect the axles $c$, $d$, by torque rods $e$, $f$, engaging the respective axles adjacent their opposite ends that is, in the preferred form, at points outside of the springs $b$. One end of the torque rods $e$ is connected rigidly to one of the axle tubes, say $d$, while the other rod $f$ has its opposite end rigidly connected to the other of the axle tubes, say $c$. Provision is made for then connecting the free ends of the rods $e$, $f$, respectively, with the other axles with capacity for universal movement. Thus, the rod $e$ carries at its free end a ball $e'$ which is secured within a socket bearing $c^2$ by means of a complementary detachable cap $c^3$ while the free end of the connecting rod $f$ is provided similarly with a ball $f'$ which seats within the socket bearing $d^2$ and is clamped therein by a complementary detachable cap $d^3$. By this construction, the dual axles $c$, $d$, are maintained in spaced relationship with certainty, torque reactions in starting and stopping are mutually resisted, and the greatest possible degree of flexibility therebetween is afforded through the ball and socket joints. For convenience in design it will be found that the respective socket bearings $c^2$, $d^2$, may be carried on the plates $c^4$, $d^4$, on which is supported in accordance with conventional practice the brake mechanism, the operating shafts for which are indicated respectively at $c^5$, $d^5$. Similarly, the fixed ends of the rods $e$, $f$, may be connected to the plates $c^6$, $d^6$, for supporting the brake mechanism at opposite ends of the respective axles $c$, $d$. The rods $e$, $f$, when thus connected to the respective plates are maintained in substantial parallelism and at opposite sides of the side frame members of the chassis outside of the springs $b$.

The construction described is compact, accessible, dependable and conforms to the best practice in motor vehicles and readily lends itself to its intended function without imposing any undue limitation on other desirable features of design and without restraining the axles unduly through the desired degrees of relative movement therebetween and with respect to the frame of the vehicle.

Changes in details of design and in form and disposition may be made without departing from the spirit of the invention.

What we claim is:

In a motor vehicle having dual rear axles with wheels thereon, brake operating mechanisms for the wheels, plates in vertical planes rigidly mounted on the axles to support the brake mechanism, a torque arm having one end thereof rigidly mounted on one of said plates carried with the forward axle of the pair of rear axles and being formed on the other end thereof with a ball, a socket bearing formed with a semi-spherical recess to receive said ball mounted rigidly on the plate in the same vertical plane as the first named plate carried with the other of the pair of rear axles, a cap formed with a semi-spherical recess to secure said ball in said socket bearing, a second torque arm having one end thereof rigidly mounted on the other of said plates carried with the rearward axle of the pair of rear axles and being formed on the other end thereof with a ball, a socket bearing formed with a semi-spherical recess to receive said ball mounted rigidly on the plate in the same vertical plane as the last named plate carried with the forward axle of the pair of rear axles, a cap formed with a semi-spherical recess to secure said ball in said socket bearing, and means to retain the caps detachably with the socket bearings.

This specification signed this 19th day of September, A. D. 1923.

AZOR D. ROBBINS.
CHARLES CHRISTIAN REINKE.